(12) United States Patent
Xie

(10) Patent No.: US 7,452,441 B2
(45) Date of Patent: Nov. 18, 2008

(54) METHOD FOR MANUFACTURING MEMBRANE ELECTRODE ASSEMBLY

(75) Inventor: Gang Xie, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 358 days.

(21) Appl. No.: 11/050,725

(22) Filed: Feb. 7, 2005

(65) Prior Publication Data
US 2005/0173061 A1    Aug. 11, 2005

(30) Foreign Application Priority Data
Feb. 9, 2004 (JP) ............... 2004-032209

(51) Int. Cl.
*C09J 5/02* (2006.01)
(52) U.S. Cl. .............. 156/308.6; 156/83; 156/309.3; 429/30; 429/43; 29/730
(58) Field of Classification Search ............ 156/83, 156/308.6, 309.3; 429/30, 43; 29/730
See application file for complete search history.

(56) References Cited

U.S. PATENT DOCUMENTS 3,471,353 A * 10/1969 Rasmussen ............ 156/289
4,141,804 A * 2/1979 Avedesian et al. ......... 205/348
6,080,503 A * 6/2000 Schmid et al. .............. 429/35
2005/0181263 A1   8/2005 Tsugane

FOREIGN PATENT DOCUMENTS

| JP | 62039285 A | * | 2/1987 |
| JP | 3-208260 | | 9/1991 |
| JP | 5-306345 | | 11/1993 |
| JP | 8-88007 | | 4/1996 |
| JP | 11-224679 | | 8/1999 |
| WO | WO 99/39840 | * | 8/1999 |

OTHER PUBLICATIONS

Abstract for JP 62039285 1987.*

* cited by examiner

*Primary Examiner*—John L Goff
(74) *Attorney, Agent, or Firm*—Oblon, Spivak, McClelland, Maier & Neustadt, P.C.

(57) ABSTRACT

A method for manufacturing a membrane electrode assembly comprises a process for preparing a electrolyte membrane and two gas diffusion layers, and a bonding process for forming the membrane electrode assembly by pressing a layered unit in which the electrolyte membrane is sandwiched between each of the two gas diffusion layers in such a way that provided catalyst layers locate in the interfaces between the electrolyte membrane and the two gas diffusion layers, wherein the bonding process is undertaken in a condition in which the surfaces of the electrolyte membrane are temporarily liquefied or softened.

2 Claims, 3 Drawing Sheets

METHOD FOR MANUFACTURING MEMBRANE ELECTRODE ASSEMBLY

This application is based on and claims priority under 35 U.S.C. § 119 to Japanese Patent Application 2004-032209, filed on Feb. 9, 2004, the entire content of which is incorporated herein by reference.

FIELD OF THE INVENTION

This invention generally relates to a method for manufacturing a membrane electrode assembly by pressing a layered unit in which an electrolyte membrane is sandwiched between two gas diffusion layers.

BACKGROUND

A various kinds of methods for manufacturing a membrane electrode assembly (hereinafter referred to as MEA) are disclosed in patent documents, such as JPH3(1991)208260A, JPH5(1993)306345A, JPH8(1996)88007A and JPH11(1999)224679A. Such MEA for fuel cell has a structure, wherein an electrolyte membrane is sandwiched between two gas diffusion layers. In this circumstance, it is required that contact resistances on interfaces between the electrolyte membrane and the gas diffusion layers are reduced so as to improve an output characteristic of the fuel cell. Thus, a layered unit in which the electrolyte membrane is sandwiched between two gas diffusion layers is pressed in a thickness direction thereof by means of press dies, which are heated at above a predetermined temperature, of a pressing machine.

According to the known method for manufacturing the MEA, the contact resistances on the interfaces between the electrolyte membrane and two gas diffusion layers, which sandwich the electrolyte membrane, can be reduced so as to improve the output characteristics of the fuel cell. However, because the level of pressure applied to the layered unit is relatively large, the electrolyte membrane is pierced by elements (e.g. carbon fiber), which comprise the gas diffusion layer, as a result the electrolyte membrane may be damaged. Further, when the level of pressure becomes excessive, structures of the catalyst layers provided between the electrolyte membrane and two gas diffusion layers may be destroyed.

Thus, a need exists for providing a method for manufacturing the MEA, which can not only enhance the bondability on the interfaces between the electrolyte membrane and two gas diffusion layers which sandwich the electrolyte membrane but also prevent damages both on the electrolyte membrane and on the catalyst layer.

SUMMARY OF THE INVENTION

According to an aspect of the present invention, a method for manufacturing a membrane electrode assembly comprises a process for preparing a electrolyte membrane and two gas diffusion layers, and a bonding process for forming the membrane electrode assembly by pressing a layered unit in which the electrolyte membrane is sandwiched between each of the two gas diffusion layers in such a way that provided catalyst layers locate in the interfaces between the electrolyte membrane and the two gas diffusion layers, wherein the bonding process is undertaken in a condition in which surfaces of the electrolyte membrane are temporarily liquefied or softened.

According to another aspect of the present invention, a method for manufacturing a membrane electrode assembly comprises a process for preparing a electrolyte membrane and two gas diffusion layers, and a bonding process for forming the membrane electrode assembly by pressing a layered unit in which the electrolyte membrane is sandwiched between each of the two gas diffusion layers in such a way that provided catalyst layers locate in the interfaces between the electrolyte membrane and the two gas diffusion layers, wherein the bonding process is undertaken in a condition in which surfaces of the provided catalyst layers on the gas diffusions are temporarily liquefied or softened.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

First Embodiment

Figure 1:
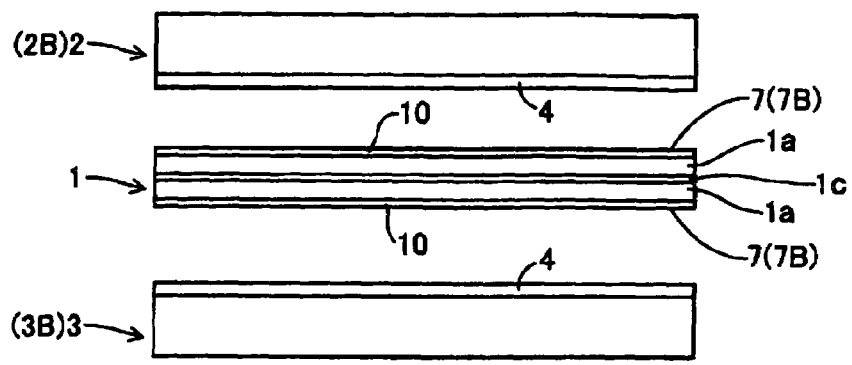
FIG. 1 illustrates a block diagram, according to the first embodiment, indicating a condition before the electrolyte membrane and gas diffusion layers are bonded.
Figure 2:
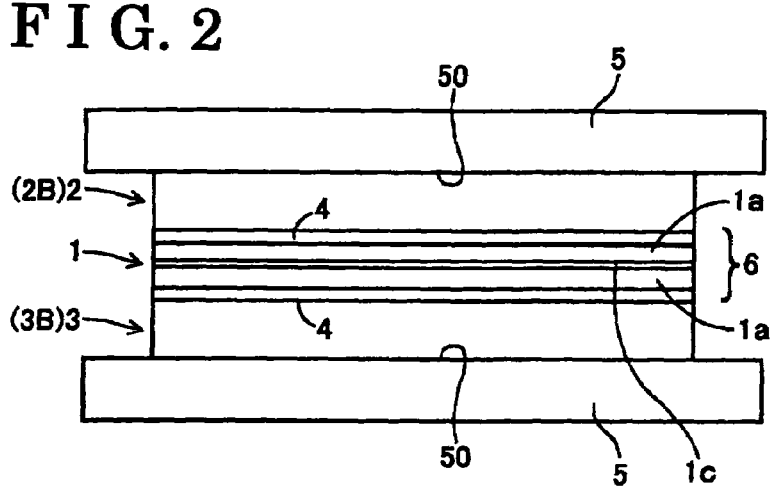
FIG. 2 illustrates a block diagram, according to the first embodiment, indicating a condition while the electrolyte membrane and gas diffusion layers are pressed so as to be bonded together by means of a pressing machine.
Figure 3:
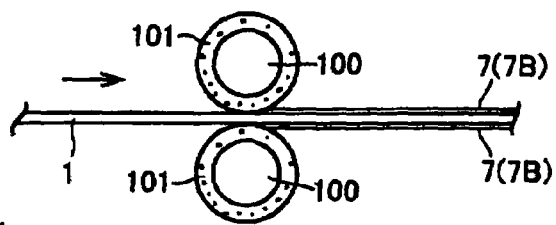
FIG. 3 illustrates a block diagram, according to the first embodiment, indicating a typical condition while an alcohol is applied to surfaces of the electrolyte membrane.

FIG. 1, FIG. 2 and FIG. 3 indicate schematic diagrams according to the first embodiment. As shown in FIG. 1, a sheet-formed electrolyte membrane 1 and sheet-formed gas diffusion layers 2 and 3 are prepared. The gas diffusion layers 2 and 3 are electrically conductive and gas permeable. The gas diffusion layers 2 and 3 include electrically conductive materials and possess pores by which gas-permeability can be secured. An electrically conductive fiber can be used as a conductive material. More specifically, a carbon fiber can be used as the electrically conductive fiber.

A catalyst layer 4 is provided on one of the surfaces of the gas diffusion layer 2 (a the surface which faces the electrolyte membrane 1) to form the gas diffusion electrode 2B for oxidizer gas. Another catalyst layer 4 is provided on one of surfaces of the gas diffusion layer 3 (the surface which faces the electrolyte membrane 1) to form the gas diffusion electrode 3B for fuel gas.

The catalyst layer 4 includes a catalyst such as platinum, an electrically conductive material such as a carbon black and an electrolyte. A layered unit in which the electrolyte membrane 1 is sandwiched between the gas diffusion layers 2 and 3, is pressed in a thickness direction thereof by means of a pressing surfaces 50 of a pressing machine 5 so as to form a MEA 6. This process is called a bonding process.

Preparatory for the bonding process, an alcohol (e.g. ethanol) 7 is applied to one of the surfaces of the electrolyte membrane 1. In addition, the alcohol (e.g. ethanol) 7 is also applied to the another surface of the electrolyte membrane 1. Thus, the both surfaces of the electrolyte membrane 1 are temporally liquefied so as to form modified portions 10. At this point, the inner portion of the electrolyte membrane 1 is not liquefied.

The alcohol 7 may be applied on the entire surfaces of the electrolyte membrane 1. The alcohol 7 may be applied on a portion of the both surfaces of the electrolyte membrane 1, a portion contacting the gas diffusion layers 2 and 3 during the bonding process. The temperature of the alcohol 7 can be set at a room temperature. The temperature of the alcohol 7 is not limited to the room temperature, and the alcohol 7 may be heated or refrigerated. The alcohol 7 can be sprayed to the electrolyte membrane 1, or the electrolyte membrane 1 can be soaked into the alcohol 7, which is poured into a container. Further, the alcohol 7 can be applied to the electrolyte membrane 1 by contacting a medium, which includes the alcohol 7, with the electrolyte membrane 1.

For example, as shown in FIG. 3, using a set of embrocation rolls 100 including impregnated layers 101, which absorb the alcohol 7, the alcohol 7 is applied to the electrolyte membrane 1. Specifically, the electrolyte membrane 1 is sent between the set of the embrocation rolls 100, and then the impregnated layers 101 of the embrocation rolls 100 contact with the both surfaces of the electrolyte membrane 1. In this manner, the alcohol 7 is applied to the electrolyte membrane 1.

After the alcohol 7 is applied to the both surfaces of the electrolyte membrane 1, a layered unit, in which the electrolyte membrane 1 is sandwiched between the gas diffusion layers 2 and 3 in such a way that the provided catalyst layers 4 locate in the interfaces between the electrolyte membrane and the two gas diffusion layers, is prepared. As shown in FIG. 2, the piled unit is pressed in a thickness direction thereof by means of a pressing surfaces 50 of the pressing machine 5, The pressing surfaces are heated at, for example, between 20° C. and 80° C. so as to form the MEA 6.

As described above, the alcohol 7 is applied on the surface layers of the electrolyte membrane 1 so as to form the modified portions 10, as a result, a level of pressure during the bonding process can be reduced. Thus, because the level of pressure is reduced, the electrolyte membrane can be prevented from being pierced by the elements, which comprise the gas diffusion layer (e.g. carbon fiber), during the bonding process. Further, damages on the electrolyte membrane 1 and the catalyst layer 4 can be reduced. As a result, output power of the fuel cell can be enhanced, at the same time, a gas leak of the oxidizer gas and the fuel gas can be reduced.

The electrolyte membrane 1 using in the first embodiment includes an electrolyte layer 1a, which is made of an ion-exchange membrane, and a reinforcement layer 1c for reinforcing the electrolyte layer 1a. In this circumstance, even when the both surfaces of the electrolyte membrane 1 are temporarily liquefied or softened so as to form the modified portions 10, the reinforcement layer 1c can enough secure the strength and the shape maintaining characteristic of the electrolyte membrane 1. Thus, a carrying process in which the electrolyte membrane 1 is carried to the pressing machine 5, and the bonding process for pressing the electrolyte membrane 1 by means of the pressing machine 5 can be undertaken preferably. The reinforcement layer 1c includes a mesh structure having a predetermined mesh. The reinforcement layer 1c may be a single or double. The electrolyte membrane 1 may not include the reinforcement layer 1c.

Figure 4:
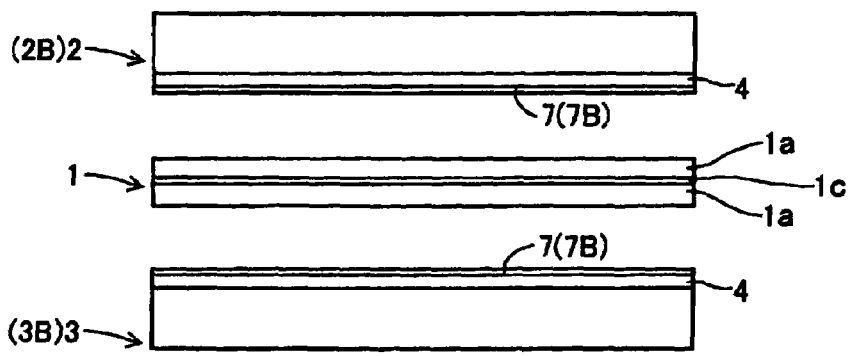
FIG. 4 illustrates a block diagram, according to the first embodiment, indicating a condition wherein an alcohol is applied to the surfaces of a provided catalyst layer on a gas diffusion layer, and the electrolyte membrane.

The bonding process is undertaken at a room temperature or within a mild temperature range (e.g. 30-80° C.). When the bonding process is undertaken within the above temperature range, a heat deterioration of the electrolyte membrane 1 can be prevented. As shown in FIG. 4, the alcohol (e.g. ethanol) 7 may be alternatively applied to the surfaces of the provided catalyst layers 4 on the gas diffusion layer 2 and the gas diffusion layer 3 (the surfaces which face electrolyte membrane 1) instead of the electrolyte membrane 1.

Second Embodiment

The second embodiment basically has a similar structure, operation and effect to those of the first embodiment, and the second embodiment will be explained with reference to from FIG. 1 to FIG. 4. The emphasis will be placed on an explanation of differences from the first embodiment. According to the second embodiment, preparatory for the pressing process, on one of the surfaces of the electrolyte membrane 1, electrolyte solution 7B is applied. Further, on the another surface of the electrolyte membrane 1, the electrolyte solution 7B is also applied. Thus, both the surfaces of the electrolyte membrane 1 are temporally liquefied so as to form the modified portions 10. The electrolyte solution 7B is a fluid substance in which the electrolyte is solved into the alcohol (e.g. isopropyl alcohol).

In this manner, after the electrolyte solution 7B is applied to the both surfaces of the electrolyte membrane 1, the electrolyte membrane 1 is sandwiched between the gas diffusion layers 2 and 3 so as to form a layered unit. As shown in FIG. 2, the layered unit, in which the electrolyte membrane 1 is sandwiched between the gas diffusion layers 2 and 3, is pressed by means of the pressing surface 50 (e.g. temperature of the molds are between 20° C. and 80° C.) of the pressing machine 5 in a thickness direction thereof so as to form the MEA 6. Thus, the level of pressure during the bonding process can be reduced. When the level of pressure is low, the electrolyte membrane can be prevented from being pierced by the elements (carbon fiber or the like), which comprises the gas diffusion layer, during the bonding process so as to prevent the damage on the electrolyte membrane. Further, the damage on the catalyst layer can also be prevented. In this circumstance, output power of the fuel cell can be enhanced, at the same time, a gas leak of the oxidizer gas and the fuel gas can be reduced.

As shown in FIG. 4, the electrolyte solution 7B may be applied to both the surfaces of the provided catalyst layers 4 on the gas diffusion layer 2 and 3.

Third Embodiment

The third embodiment basically has a similar structure, operation and effect to those of the first embodiment, and the third embodiment will be explained with reference to FIG. 5 and FIG. 6. The emphasis will be placed on an explanation of differences from the first embodiment.

In the third embodiment, a sheet-formed electrolyte membrane 1, and sheet-formed gas diffusion layers 2 and 3 are prepared. On the surface of the gas diffusion layer 2 (the surface which faces electrolyte membrane 1), and the surface of the gas diffusion layer 3 (the surface which faces electrolyte membrane 1), the catalyst layers 4 are provided. The catalyst layer 4 includes a catalyst such as platinum, an electrically conductive material such as a carbon black, and an electrolyte. After the electrolyte solution 7B is applied to the both surfaces of the electrolyte membrane 1, the electrolyte membrane 1 is sandwiched between the gas diffusion layers 2 and 3 so as to form a layered unit. The layered unit, in which the electrolyte membrane 1 is sandwiched between the gas diffusion layers 2 and 3, is pressed in a thickness direction thereof by means of the pressing surface 50 (e.g. temperature of the molds are between 20° C. and 80° C.) of the pressing machine 5 so as to form the MEA 6.

Figure 5:
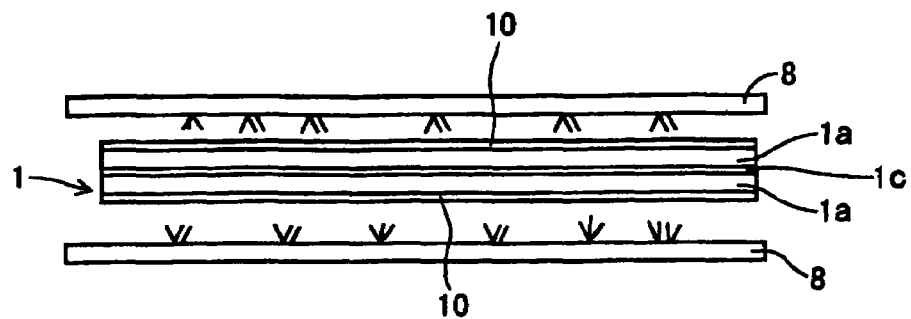
FIG. 5 illustrates a block diagram, according to the third embodiment, indicating a condition wherein the both surfaces of the electrolyte membrane are heated by means of a heat source.
Figure 6:
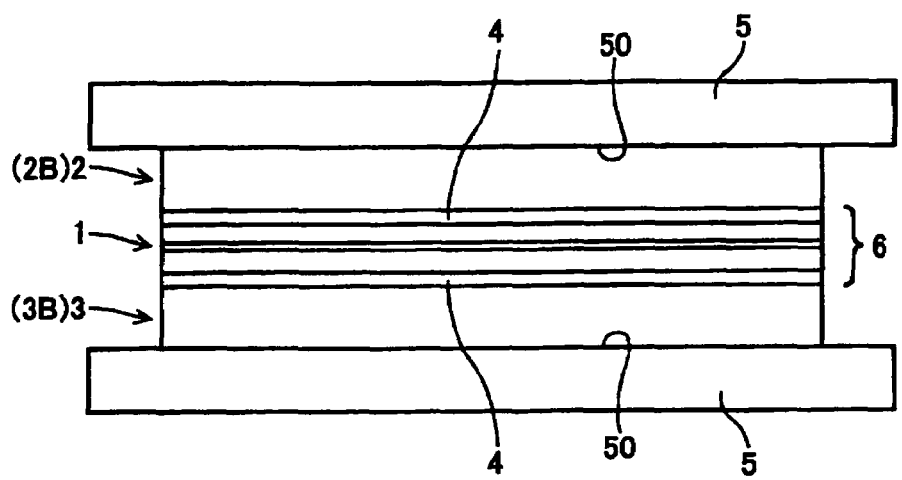
FIG. 6 illustrates a block diagram, according to the third embodiment, indicating a condition wherein the electrolyte membrane and the gas diffusion layers are pressed so as to be bonded together by means of the pressing machine.

Preparatory for the pressing process, as shown in FIG. 5, the both surfaces of the electrolyte membrane 1 are temporally softened or liquefied by means of the flat-shaped heat sources 8 so as to form the modified portions 10. The heat source 8, which is made of a far infrared radiation source, emits the far infrared radiation. Subsequently, the layered unit, in which the electrolyte membrane 1 is sandwiched between the gas diffusion layers 2 and 3, is pressed by means of the pressing surface 50 (e.g. temperature of the molds are between 20° C. and 80° C.) of the pressing machine 5 in a thickness direction thereof so as to form the MEA 6.

As a result, when the level of pressure is low, the electrolyte membrane can be prevented from being pierced by the elements (carbon fiber or the like), which comprises the gas diffusion layer, during the bonding process so as to prevent the damage on the electrolyte membrane. Further, the damage on the catalyst layer 4 can also be prevented. In this circumstance, output power of the fuel cell can be enhanced, at the same time, a gas leak of the oxidizer gas and the fuel gas can be reduced.

The electrolyte membrane 1 includes an electrolyte layer 1a and a reinforcement layer 1c for reinforcing the electrolyte layer 1a. The reinforcement layer 1c includes a mesh structure. In this circumstance, even when the both surfaces of the electrolyte membrane 1 are temporarily liquefied or softened so as to form the modified portions 10, the reinforcement layer 1c can enough secure the strength and the shape maintaining characteristic of the electrolyte membrane 1. Thus, a carrying process in which the electrolyte membrane 1 is carried to the pressing machine 5, and the bonding process for pressing the electrolyte membrane 1 by means of the pressing machine 5, can be undertaken preferably. The electrolyte membrane 1 may not include the reinforcement layer 1c. The alcohol solution 7, or the electrolyte solution 7B may be applied to the exposed surface of the catalyst layers 4 of the gas diffusion layer 2 and the exposed surface of the catalyst layers 4 of the gas diffusion layer 3, while the exposed surface of the catalyst layers 4 of the gas diffusion layer 2 and the exposed surface of the catalyst layers 4 of the gas diffusion layer 3 are heated by means of the heat source 8. The bonding process is undertaken at a room temperature. The bonding process may also be undertaken within a mild temperature range.

Fourth Embodiment

Figure 7:
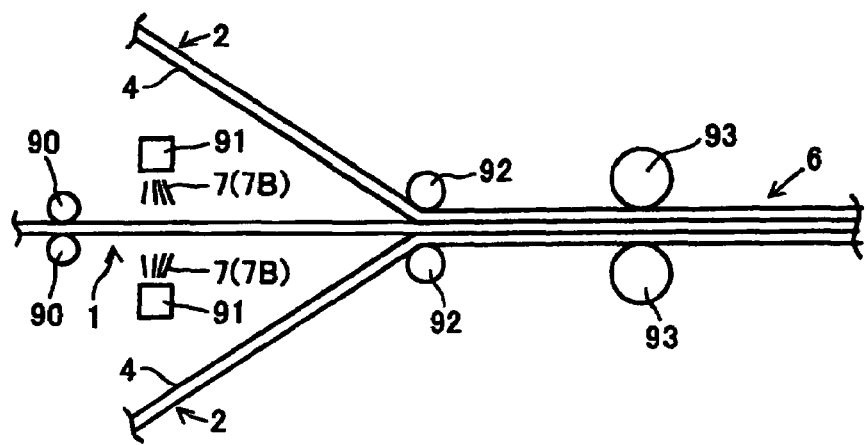
FIG. 7 illustrates a block diagram, according to the fourth embodiment, indicating a condition wherein a alcohol is applied to the surfaces of the electrolyte membrane, and then the electrolyte membrane and the gas diffusion layers are pressed so as to be bonded together.

FIG. 7 indicates a schematic diagram of the fourth embodiment 4. As shown in FIG. 7, the electrolyte membrane 1 and the gas diffusion layers 2 and 3 are prepared separately. The electrolyte membrane 1 is conveyed by means of a convey roll 90, at the same time, preparatory for the pressing process, the alcohol (e.g. ethanol) 7 is sprayed by means of a sprayer 91 to the both surfaces of the electrolyte membrane 1. The gas diffusion layers 2 and 3 are guided along with the electrolyte membrane 1 by means of a pair of guiding rolls 92 so as to form a layered unit, in which the electrolyte membrane 1 is sandwiched between the gas diffusion layers 2 and 3. Finally, the layered unit is pressed in a thickness direction thereof by means of a pair of pressing rolls 93 (e.g. heated between 20° C. and 80° C.) of the pressing machine.

In this manner, after the alcohol 7 is applied to the both surfaces of the electrolyte membrane 1, the electrolyte membrane 1 is sandwiched between the gas diffusion layers 2 and 3 so as to form a layered unit. Then, the layered unit, in which the electrolyte membrane 1 is sandwiched between the gas diffusion layers 2 and 3, is pressed by means of the pressing roll 93 in a thickness direction thereof so as to form the MEA 6. Thus, the level of pressure during the bonding process can be reduced in the same manner as the first embodiment. As a result, when the level of pressure is low, the electrolyte membrane can be prevented from being pierced by the elements (carbon fiber or the like), which comprises the gas diffusion layer, during the bonding process so as to prevent the damage on the electrolyte membrane. Further, the damage on the catalyst layer 4 can also be prevented. In this circumstance, output power of the fuel cell can be enhanced, at the same time, a gas leak of the oxidizer gas and the fuel gas can be reduced.

To the both surfaces of the electrolyte membrane 1, the electrolyte solution 7B can be sprayed instead of the alcohol 7 by means of the sprayer 91. The alcohol 7 or the electrolyte solution 7B may be sprayed by means of the sprayer 91 to the surfaces of catalyst layers 4 on the gas diffusion layers 2 and 3 instead of to the electrolyte membrane 1. The alcohol 7 or the electrolyte solution 7B may be sprayed by means of the sprayer 91 to the surface of the catalyst layers 4 on the gas diffusion layers 2 and 3, and to the electrolyte membrane 1. The bonding process is undertaken at a room temperature or a mild temperature range.

Fifth Embodiment

The fifth embodiment basically has a similar structure, operation and effect to those of the first embodiment, and the fifth embodiment will be explained with reference to FIGS. 8A and 8B, which are schematic diagrams of the fifth embodiment.

Figure 8A:
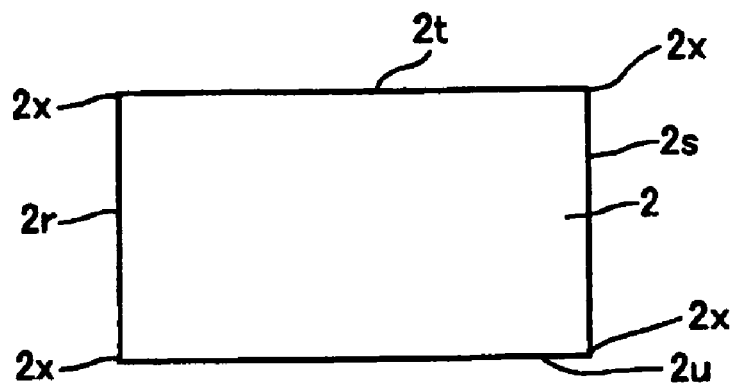
FIG. 8A illustrates a plane diagram indicating a gas diffusion layer according to the fifth embodiment.
Figure 8B:
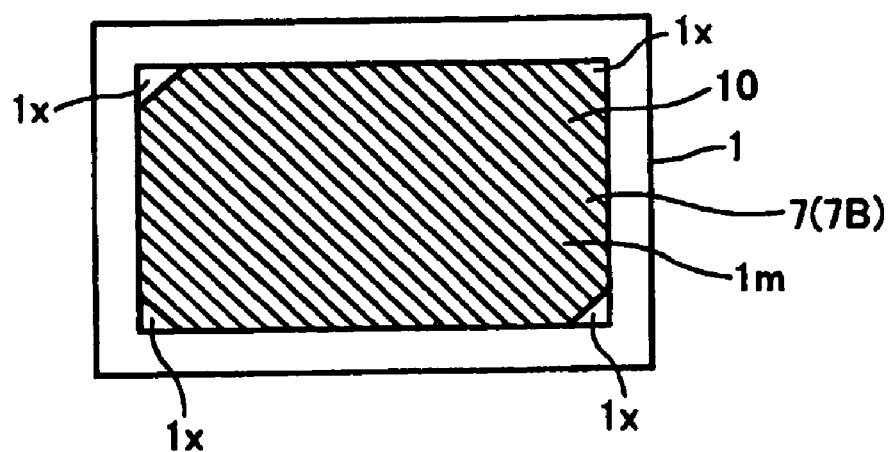
FIG. 8B illustrates a plane diagram indicating a condition, according to the fifth embodiment, in which an alcohol or an electrolyte solution is applied to a central area of the electrolyte membrane.

According to the fifth embodiment, as shown in FIG. 8A, the gas diffusion layer 2 includes sides 2r and 2s, which face each other, sides 2t and 2u, which face each other, and corner areas 2x. To a central area 1m of the surface of the electrolyte membrane 1 and a central area 1m of the another surface of the electrolyte membrane 1, which are larger in size than that of the gas diffusion layer 2, the alcohol solution 7 or the electrolyte solution 7B is applied so as to form modified portions 10.

As shown in FIG. 7(B), on areas 1x of the electrolyte membrane 1, which neighbor to the corner areas 2x of gas diffusion layer 2, the alcohol solution 7 or the electrolyte solution 7B is not applied, or the amount of the alcohol solution 7 or the electrolyte solution 7B, which is applied to the areas 1x, is less than the amount of the alcohol solution 7 or the electrolyte solution 7B, which is applied to the central areas 1m, so as to lessen the density of the alcohol solution 7 or the electrolyte solution 7B applied to the areas 1x comparing to the amount of these solutions applied to the central areas 1m. At this point, the gas diffusion layer 3 has a similar configuration.

In the same manner as the embodiment 1, the layered unit, in which the electrolyte membrane 1 is sandwiched between the gas diffusion layers 2 and 3 is pressed in a thickness direction thereof so as to form the MEA 6. Even when the level of pressure is low during the bonding process, because the alcohol solution 7 or the electrolyte solution 7B is applied on the both surfaces of the electrolyte membrane 1, in the same manner as the embodiment 1, bondability between the electrolyte membrane 1 and the gas diffusion layers 2 and 3 can be preferably secured so as to enhance an output power of the fuel cell, and to prevent the gas leak, as a result to prevent the damage on the electrolyte membrane electrolyte membrane 1.

When the fuel cell, which has been reached the end of its lifetime, is to be disassembled, the gas diffusion layers 2 and 3 can be smoothly released from the area 1x of the electrolyte membrane 1 at a point where the modifying substance is not applied or is lightly applied, so as to ease the disassembling operation of the used-fuel cell.

FIRST EXAMPLE

In the first example, 300 g carbon black is suspended in 1000 g water. This suspension has been agitated for ten minutes by means of an agitator. Then, 250 g tetrafluoroethylene (herein after referred to as PTFE) dispersion solution (DAIKIN INDUSTRIES, ltd., POLYFLON D1 grade) containing PTFE particle at 60 wt %, is mixed to the above suspension. The mixture is further agitated for tem minutes to form a carbon ink.

Furthermore, a carbon paper (Toray Industries, Inc., Toray Carbon Paper—TGP-060, 180 µm in thickness) is sunk into the carbon ink so that the carbon paper is impregnated with the carbon ink. Then, the carbon paper, which includes the carbon ink, is dried by means of a drying furnace at 80° C., so as to evaporate excess water. Then, the carbon paper has been sintered for 60 minutes at 390° C. In this circumstance, PTFE in the carbon paper is sintered so as to form a water-repellent carbon paper. This carbon paper is used for the gas diffusion layers 2 and 3.

Next, a catalyst paste is formed, in which 12 g carbon supported platinum catalyst (Tanaka Kikinzoku Kogyo KK., TEC 1OE60E) containing 55 wt % platinum, 106 g ion exchange resin solution (ASAHI KASEI CORPORARION, SS-1080) containing 5 wt % ion exchange resin, 23 g water, 23 g isopropyl alcohol are mixed. The catalyst paste is applied to the gas diffusion layer 2 by means of a doctor blade method so as to form a catalyst layer 4 on the gas diffusion layer 2, a loading amount of platinum in the catalyst layer 4 is 0.8 mg/cm2. Then, the gas diffusion layer 2 on which the catalyst layer 4 is formed is dried so as to form a gas diffusion electrode 2B for an oxidizer gas.

On the other hand, the gas diffusion electrode 3B for a fuel gas is formed as follows. In this process, a carbon supported platinum ruthenium alloy catalyst (Tanaka Kikinzoku Kogyo KK., TEC61E54) is used instead of the carbon supported platinum catalyst. The carbon supported platinum ruthenium alloy catalyst includes 30 wt % platinum and 23 wt % ruthenium.

The carbon supported platinum ruthenium alloy catalyst is applied to the gas diffusion layer 3 so as to form a catalyst layer 4 on the gas diffusion layer 3, loading amount of platinum in the catalyst layer 4 is 0.4 mg/cm2. Then, the gas diffusion layer 3 on which the catalyst layer 4 is formed is dried so as to form a gas diffusion electrode 3B for a fuel gas.

An ion-exchange membrane (Japan Gore-Tex Inc., GORE-SELECT 30) of 30 µm in thickness is used as an electrolyte membrane 1. On the both side of the electrolyte membrane 1, an alcohol solution of 99.5% concentration is applied. Within ten minutes after the application, the electrolyte membrane 1 is sandwiched between the gas diffusion electrode 2B for the oxidizer gas and the gas diffusion electrode 3B for the fuel gas so as to form a layered unit. In this circumstance, the catalyst layer 4 of the gas diffusion electrode 3B for fuel gas contacts to one surface of the electrolyte membrane 1 in a thickness direction thereof, and the another catalyst layer 4 of the gas diffusion electrode 2B for oxidizer gas contacts to the another surface of the electrolyte membrane 1 in a thickness direction thereof. The layered unit, which is prepared in the above process, is pressed at pressure 0.2 Mpa for five minutes with press dies (at 25° C.) of a pressing machine at room temperature (approximately at 25° C.). The amount of the pressure applied in this example (0.2 Mpa) is a fortieth part of the amount of pressure (8 MPa) used in the comparative examples 1 and 2.

A fuel cell comprised with the MEA, which is formed in the above process, is tested for 1000 hours with cell temperature at 75° C., supplying air (utility efficiency 40%) to a the oxidizer electrode, at the same time, supplying simulated reformate gas (utility efficiency 90%), which includes 10 ppm CO, to the fuel electrode at an ambient pressure, and current density at 0.17 A/m2. Further, as a test for measuring the gas cross leak of the MEA according to the first example, a nitrogen gas at 20 kPa is injected into one side of the MEA, and the other side of the MEA is opened to the air. This condition has been maintained for five minutes, and then the declined amount of the pressure at the side of the MEA, in which the nitrogen is injected, is measured. Table 1 indicates a initial cell voltage, a cell voltage after 1000 hours running test, a initial cell cross leak amount, a cell cross leak amount after 1000 hours running.

SECOND EXAMPLE

In the same manner as the first example, a gas diffusion electrode 2B for the oxidizer gas, the gas diffusion electrode 3B for the fuel gas and an electrolyte membrane 1 are prepared. An alcohol solution is applied on a catalyst layer 4 of the gas diffusion electrode 2B for oxidizer gas, at the same time, an alcohol solution is applied to the catalyst layer 4 of the gas diffusion electrode 3B for fuel gas.

In this circumstance, the catalyst layer 4 of the gas diffusion electrode 2B for the oxidizer gas contacts to one surface of the electrolyte membrane 1 in a thickness direction thereof, and another catalyst layer 4 of the gas diffusion electrode 3B for the fuel gas contacts to the another surface of the electrolyte membrane 1 in a thickness direction thereof. Then, the electrolyte membrane 1 is sandwiched between the gas diffusion electrode 2B for the oxidizer gas and the gas diffusion electrode 3B for the fuel gas so as to form a layered unit. The layered unit, which is prepared in the above process, is pressed at pressure 0.2 MPa for five minutes at a room temperature (approximately at 25° C.) so as to form a MEA used in the second example. This MEA is evaluated in the same manner as the first example. The result of the estimation is shown in a table 1.

First Comparative Example

In the same manner as the first example, a gas diffusion electrode 2B for oxidizer gas, a gas diffusion electrode 3B for fuel gas, and an electrolyte membrane 1 are prepared. In this case, the alcohol solution is not applied either to the both surfaces of the electrolyte membrane 1 or to the surfaces of the gas diffusion electrode 2B and 3B. Instead, the electrolyte membrane 1 is sandwiched between the gas diffusion electrode 2B for the oxidizer gas and the gas diffusion electrode 3B for the fuel gas so as to form a layered unit, and the layered unit is hot pressed at pressure 8 Mpa for five minutes at 140° C., and then, a MEA for the first comparative example is formed. This MEA is evaluated in the same manner as the first example, and the result is shown in the table 1.

Second Comparative Example

First, in the same manner as the first example, a gas diffusion electrode 2B for the oxidizer gas, a gas diffusion electrode 3B for fuel gas and an electrolyte membrane 1 are prepared. Then the electrolyte membrane 1 is sandwiched between the gas diffusion electrode 2B for the oxidizer gas and the gas diffusion electrode 3B for the fuel gas so as to form a layered unit, in which a catalyst layer 4 on the gas diffusion electrode 2B for the oxidizer gas contacts with one surface of the electrolyte membrane 1, and a catalyst layer 4 on the gas diffusion electrode 3B for the fuel gas contacts with the other surface of the electrolyte membrane 1. In this circumstance, the alcohol solution is not applied to the both surfaces of the electrolyte membrane 1. The layered unit, which is formed in the above process, is pressed is hot pressed at pressure 0.2 MPa for five minutes at a room temperature (approximately 25° C.) so as to form a MEA, however, the MEA is not bonded together preferably. This MEA is evaluated in the same manner as the first comparative example, and the result is shown in the table 1.

TABLE 1

| | 1st comparative example | 2nd comparative example | 1st example | 2nd example |
| --- | --- | --- | --- | --- |
| Initial cell voltage (volt) | 0.758 | 0.743 | 0.771 | 0.769 |
| Cell voltage after test (volt) | 0.741 | 0.729 | 0.763 | 0.762 |
| Initial cell cross leak Kpa/5 min@20 KPa | 0 | 0 | 0 | 0 |
| Cell cross leak after test Kpa/5 min@20 KPa | 0.96 | 0.28 | 0.02 | 0.03 |

As shown in the table 1, polymer electrolyte fuel cell prepared in the first example and the second example is superior in a cell power output characteristic and a gas leaking prevention characteristic comparing to the polymer electrolyte fuel cell in the comparative examples. This superiority is inferred due to the prevention of damage on the electrolyte membrane 1 on the polymer electrolyte fuel cell.

The bonding processes in the above embodiments are undertaken at a room temperature or within a mild temperature range (30° C.-80° C.). However, the temperature is not limited to such condition. Provided the surfaces of either the electrolyte membrane 1 or the surfaces of the provided catalyst layers 4 on the gas diffusion layers 2 and 3 are temporarily liquefied or softened, the bonding processes can be undertaken by means of the hot pressing while the level of pressure can be reduced. In this circumstance, a hot pressing time can be shortened as well.

Further, in the above embodiments, the alcohol 7 or the electrolyte solution 7B is applied to the both sides of the electrolyte membrane 1, however, the alcohol 7 or the electrolyte solution 7B may be applied to either one of the surfaces of the electrolyte membrane 1. Furthermore, the alcohol 7 or the electrolyte solution 7B is applied to both the gas diffusion layers 2 and 3, however, alcohol 7 or the electrolyte solution 7B may be applied to either one of the gas diffusion layers 2 or 3.

As described above, the method for manufacturing a MEA includes a process for preparing the electrolyte membrane and the gas diffusion layers, and a bonding process for forming the MEA by pressing a layered unit in which the electrolyte membrane is sandwiched between the two gas diffusion layers in such a way that the provided catalyst layers locate in the interfaces between the electrolyte membrane and the two gas diffusion layers, wherein the bonding process is undertaken while the surfaces of the electrolyte membrane are temporarily liquefied or softened.

The manufacturing method for manufacturing the MEA, the bonding process is undertaken while the surfaces of the electrolyte membrane are temporarily liquefied or softened. In this circumstance, even if the level of pressure during the bonding process is reduced, bondability between the electrolyte membrane and the gas diffusion layers can be secured. In this manner, because the level of pressure during the bonding process can be reduced, the electrolyte membrane can be prevented from being pierced by the elements (carbon fiber or the like), which comprise the gas diffusion layer, during the bonding process, as a result, the damage on the electrolyte membrane can be prevented. Further, the damage on the catalyst layer can also be prevented.

The bonding process is undertaken, for example, while the surfaces of the electrolyte membrane are temporarily liquefied or softened by means of a modifying substance such as an organic solvent. Further, as an organic solvent, at least one of alcohol, ester (methyl acetate or the like), ketone (acetone, methyl ethyl ketone or the like), ether, carbon hydride (benzene toluene) can be used depending on materials of the electrolyte membrane, the gas diffusion layer and the catalyst layer; a required bonding force or a level of pressure during the pressing process. More specifically, a methanol, an ethanol, an isopropyl alcohol or a butanol can be used as the alcohol. The modifying substance of the organic solvent can be applied on the electrolyte membrane. Alternatively, the electrolyte membrane can be dipped into the modifying substance of the organic solvent. The organic solvent at a room temperature can be used. Alternatively, the organic solvent can be heated so as to be used.

The bonding process can be undertaken while the surfaces of the electrolyte membrane are temporarily liquefied or softened by means of a heat source. In this circumstance, when the bonding process is undertaken while the surfaces of the electrolyte membrane are temporarily liquefied or softened, the level of pressure during the bonding process can be reduced. As a heat source, an infrared radiation source (including a far infrared radiation source) can be used.

As mentioned above, when the bonding process is undertaken while the surfaces of the electrolyte membrane are temporarily liquefied or softened by means of the modifying substance or the heat source or the like, the interfaces between the electrolyte membrane and the two gas diffusion layers, which sandwich the electrolyte membrane therebetween, can be roughened depending on the level of the liquefy or soften.

In this circumstance, proton conduct areas on the interfaces can be increased. Further, by roughening the interface, an anchor effect, which enhances the bonding forces between the electrolyte membrane and the two gas diffusion layers, can be obtained. Generally, the catalyst layers are formed between the electrolyte membrane and two gas diffusion layers, which sandwich the electrolyte membrane therebetween. Before preparation for the MEA, the catalyst layers may be formed on one or both of the surfaces of the electrolyte membrane, or on one surface of each of the gas diffusion layer.

The method for manufacturing a MEA includes a process for preparing the electrolyte membrane and the gas diffusion layers, and a bonding process for forming the MEA by pressing a layered unit in which the electrolyte membrane is sandwiched between the two gas diffusion layers in such a way that the provided catalyst layers locate in the interfaces between the electrolyte membrane and the two gas diffusion layers, wherein the bonding process is undertaken while the surfaces of the provided catalyst layers on the gas diffusion layers are temporarily liquefied or softened.

The method for manufacturing the MEA, the bonding process is undertaken while the surfaces of the provided catalyst layers on the gas diffusion layers are temporarily liquefied or softened. In this circumstance, even if the level of pressure during the bonding process is reduced, bondability of the electrolyte membrane and the gas diffusion layers can be secured. In this manner, because the level of pressure during the bonding process can be reduced, the electrolyte membrane can be prevented from being pierced by the elements (carbon fiber or the like), which comprises the gas diffusion layer, during the bonding process so as to prevent the damage on the electrolyte membrane. Further, the damage on the catalyst layer can also be prevented.

In this circumstance, the bonding process is undertaken while the surfaces of the provided catalyst layers on the gas diffusion layers are temporarily liquefied or softened by means of an organic solvent. As an organic solvent, at least one of alcohol, ester (methyl acetate or the like), ketone (acetone, methyl ethyl ketone or the like), ether, carbon hydride (benzene, toluene) can be used depending on materials of the electrolyte membrane, the gas diffusion layer and the catalyst layer; a required bonding force; a level of pressure during the pressing process or the like.

The bonding process can also be undertaken while the surfaces of the provided catalyst layers on the gas diffusion layers are temporarily liquefied or softened by means of a heat source. In this circumstance, where the bonding process is undertaken while the surfaces of the provided catalyst layers on the gas diffusion layers are temporarily liquefied or softened, the level of pressure during the bonding process can be reduced. As a heat source, an infrared radiation source (including a far infrared radiation source) can be used.

As mentioned above, when the bonding process is undertaken while the surfaces of the provided catalyst layers on the gas diffusion layers are temporarily liquefied or softened, interfaces between the electrolyte membrane and the two provided catalyst layers on the gas diffusion layers can be roughened depending on the level of the liquefy or soften. In this circumstance, proton conduct areas on the interfaces can be increased. Further, by roughening the interface, an anchor effect, which enhances the bonding forces between the electrolyte membrane and the two gas diffusion layers, can be obtained.

The bonding process of the present invention can be undertaken while the modifying substance such as an organic solvent is applied between the electrolyte membrane and the two gas diffusion layers, which sandwich the electrolyte membrane therebetween. Thus, even when the level of pressure during the bonding process is reduced, bondability between the electrolyte membrane and the two gas diffusion layers, which sandwich the electrolyte membrane can be secured. In this manner, because the level of pressure during the bonding process can be reduced, the electrolyte membrane can be prevented from being pierced by the elements (carbon fiber or the like), which comprise the gas diffusion layer, during the bonding process so as to prevent the damage on the electrolyte membrane. In this circumstance, the modifying substance such as the organic solvent is applied on the surfaces of the electrolyte membrane. However, the modifying substance such as the organic solvent may be applied on the surfaces of the provided catalyst layers on the gas diffusion layers on the circumstances.

The bonding process according to the present invention may be undertaken by means of a pressing machine having press dies or by means of a pressing machine having roll press dies. The bonding process can be undertaken at a room temperature or within a mild temperature range. The range of the room temperature is set to be between 20° C. and 30° C. The range of the mild temperature is set to be between 30° C. and 80° C. Thus, when the bonding process is undertaken under a room temperature atmosphere or a low temperature atmosphere, a heat deterioration on the electrolyte membrane can be reduced.

The electrolyte membrane may include a reinforcement layer. In this circumstance, if the surfaces of the electrolyte membrane are temporarily liquefied or softened, a strength and a shape maintaining property of the electrolyte membrane can be secured so as to undertake the bonding process smoothly. The reinforcement layer includes a mesh structure and a structure using reinforcing fiber. The electrolyte membrane may not include a reinforcement layer.

According to the present invention, at least on a portion of the entire surface of either the electrolyte membrane or the gas diffusion layer, the modifying substance may not be applied or may be lightly applied. Even the level of pressure is low, enough bondability between the central areas of the electrolyte membrane and the gas diffusion layer can be secured. As a result, output power of the fuel cell can be enhanced, at the same time, a gas leak of the oxidizer gas and the fuel gas can be reduced. Since the level of pressure during the bonding process is reduced, the damage on the electrolyte membrane can be reduced.

When the fuel cell, which has been reached the end of its lifetime, is to be disassembled, the gas diffusion layers can be released from, for example, the electrolyte membrane at a point where the modifying substance is not applied or is lightly applied.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A method for manufacturing a membrane electrode assembly, comprising:

a process for preparing a electrolyte membrane and two gas diffusion layers, and a bonding process for forming the membrane electrode assembly by pressing a layered unit in which the electrolyte membrane is sandwiched between the two gas diffusion layers in such a way that catalyst layers are located in the interfaces between the electrolyte membrane and the two gas diffusion layers, wherein the bonding process is undertaken in a condition in which surfaces of the electrolyte membrane are temporarily liquefied or softened, wherein the bonding process is undertaken while the surfaces of the electrolyte membrane are temporarily liquefied or softened by use of a modifying substance, wherein the modifying substance is applied in a first amount to a first portion of surfaces of the electrolyte membrane that are in contact with a gas diffusion layer, and the modifying substance is either not applied, or applied in second amount less than the first amount to a second portion of the surfaces of the electrolyte membrane that are in contact with a gas diffusion layer, and wherein said second portion is adjacent to a corner of one of the gas diffusion layers.

2. A method for manufacturing a membrane electrode assembly, comprising:

a process for preparing a electrolyte membrane and two gas diffusion layers, and a bonding process for forming the membrane electrode assembly by pressing a layered unit in which the electrolyte membrane is sandwiched between the two gas diffusion layers in such a way that catalyst layers are located in the interfaces between the electrolyte membrane and the two gas diffusion layers, wherein the bonding process is undertaken in a condition in which surfaces of the electrolyte membrane are temporarily liquefied or softened, wherein a first portion of surfaces of the electrolyte membrane that are in contact with a gas diffusion layer is liqiuefied or softened, and a second portion of surfaces of the electrolyte membrane that are in contact with a gas diffusion layer is not liquefied or softened at all, or only liquefied or softened to a lesser amount than the first portion, and wherein said second portion of the surfaces of the electrolyte membrane is adjacent to a corner of one of the gas diffusion layers.

* * * * *